US008458054B1

(12) United States Patent
Thakur (10) Patent No.: US 8,458,054 B1
(45) Date of Patent: Jun. 4, 2013

(54) METHOD, MEDIUM, AND SYSTEM FOR SUGGESTING IMAGES FOR ITEMS WITHOUT IMAGES IN LISTINGS DATA (75) Inventor: Mahesh Mohan Thakur, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 205 days.

(21) Appl. No.: 13/107,381

(22) Filed: May 13, 2011

(51) Int. Cl.
*G06Q 30/00* (2012.01)
(52) U.S. Cl.
USPC ........................................................ 705/27.1
(58) Field of Classification Search
USPC ...................................... 705/26.1, 27.1, 27.2
See application file for complete search history.

(56) References Cited

U.S. PATENT DOCUMENTS

| 7,460,735 B1* | 12/2008 | Rowley et al. ................ 382/305 |
| 2004/0143600 A1* | 7/2004 | Musgrove et al. ......... 707/104.1 |
| 2007/0078726 A1* | 4/2007 | MacDonald Korth et al. . 705/26 |
| 2010/0217684 A1* | 8/2010 | Melcher et al. ................. 705/27 |
| 2012/0259710 A1* | 10/2012 | Peterson .................... 705/14.72 |

OTHER PUBLICATIONS

Gerald L. Lohse and Peter Spiller. 1998. Electronic shopping. Commun. ACM 41, 7 (Jul. 1998), 81-87.*

* cited by examiner

*Primary Examiner* — Matthew Zimmerman
(74) *Attorney, Agent, or Firm* — Hope Baldauff, LLC (57) ABSTRACT

Technologies for providing suggestions of images for items without images in listings data are described herein. Item details regarding a number of items to be listed in online marketplace are received from a seller, validated, and processed before being merged in an item catalog. Those items submitted without image data specifying one or more images for the item are identified. An image index maintained in the online marketplace system and indexing images for popular items by keyword is searched to locate a number of images related to the items with missing image data. The items with missing image data are presented to the seller along with suggested images for the item. The seller selects one or more of the suggested images and the images are added to the listings data for the item before being merged into the item catalog.

20 Claims, 4 Drawing Sheets

FIG. 4

METHOD, MEDIUM, AND SYSTEM FOR SUGGESTING IMAGES FOR ITEMS WITHOUT IMAGES IN LISTINGS DATA

BACKGROUND

A merchant may provide an online marketplace for the purchase of a variety of items by customers online or over the telephone. Such items may include products that are shipped directly to the customer, media that is downloaded by the customer, and services made available to the customer over the Internet. The items may be made available for sale by a number of sellers, with multiple sellers offering the same item. The sellers may submit the details required to list the items through the online marketplace to the merchant's online marketplace system. Such item details may include an identifier of the item, a manufacturer name and/or part or model number, an item description, one or more images for the item, a purchase price, availability of the item, and the like.

The online marketplace system may consolidate the details regarding a particular item provided by the various sellers by matching item identifying information, such as Universal Product Code ("UPC") or International Article Number ("EAN"), manufacturer and part number, item title, and/or item description. The consolidated item details may then be placed in an item catalog and made available online for searching and browsing by customers wishing to purchase the corresponding items from the sellers. When a particular search of the item catalog is performed by a customer, the details of the matching items may be presented to the customer along with a list of the sellers offering each item, their corresponding purchase price and availability, and a mechanism for purchasing the item from the seller. The merchant and sellers are all benefited by providing as much information as possible regarding the items available in the item catalog in order to both drive customers to the online marketplace as well as persuade customers to purchase.

Having one or more images for an item in the item catalog may be a critical piece of information to cause a customer to click on the item to view and/or purchase the item. Items having one or more images may generate much higher click-through rates from search results to item detail/purchase pages than items without images. However, requiring the seller to provide an image with every item submitted to the online marketplace system may be difficult and require too much work from the seller. Therefore, some items in the item catalog may be presented to customers without images, resulting in reduced sales for the seller and reduced commissions for the merchant.

It is with respect to these and other considerations that the disclosure made herein is presented.

DETAILED DESCRIPTION

The following detailed description is directed to providing suggestions of images for items without images in listings data. Utilizing the technologies described herein, a merchant providing an online marketplace for the sale of items by a variety of sellers may improve the quality of listings in the item catalog by making it easier for sellers to specify images for items that did not have images supplied with the original item details. Having robust product information available for items in the item catalog, including images, may both drive customers to the online marketplace as well as persuade customers to purchase. In addition, having one or more images may generate much higher click-through rates from search results to item detail/purchase pages than items without an image, resulting in more sales for the seller and higher commissions for the merchant implementing the online marketplace.

According to embodiments, item details regarding a number of items to be listed in an online marketplace are received from a seller, validated, and processed before being merged in the item catalog and made available online for purchasing by customers. Those items submitted without image data specifying one or more images for the item are identified. An image index maintained in the online marketplace system and indexing images for popular items by keyword is searched to locate a number of images related to the items with missing image data. The items with missing image data are presented to the seller along with suggested images for the item. The seller selects one or more of the suggested images and the images are added to the listings data for the item before being merged into the item catalog.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
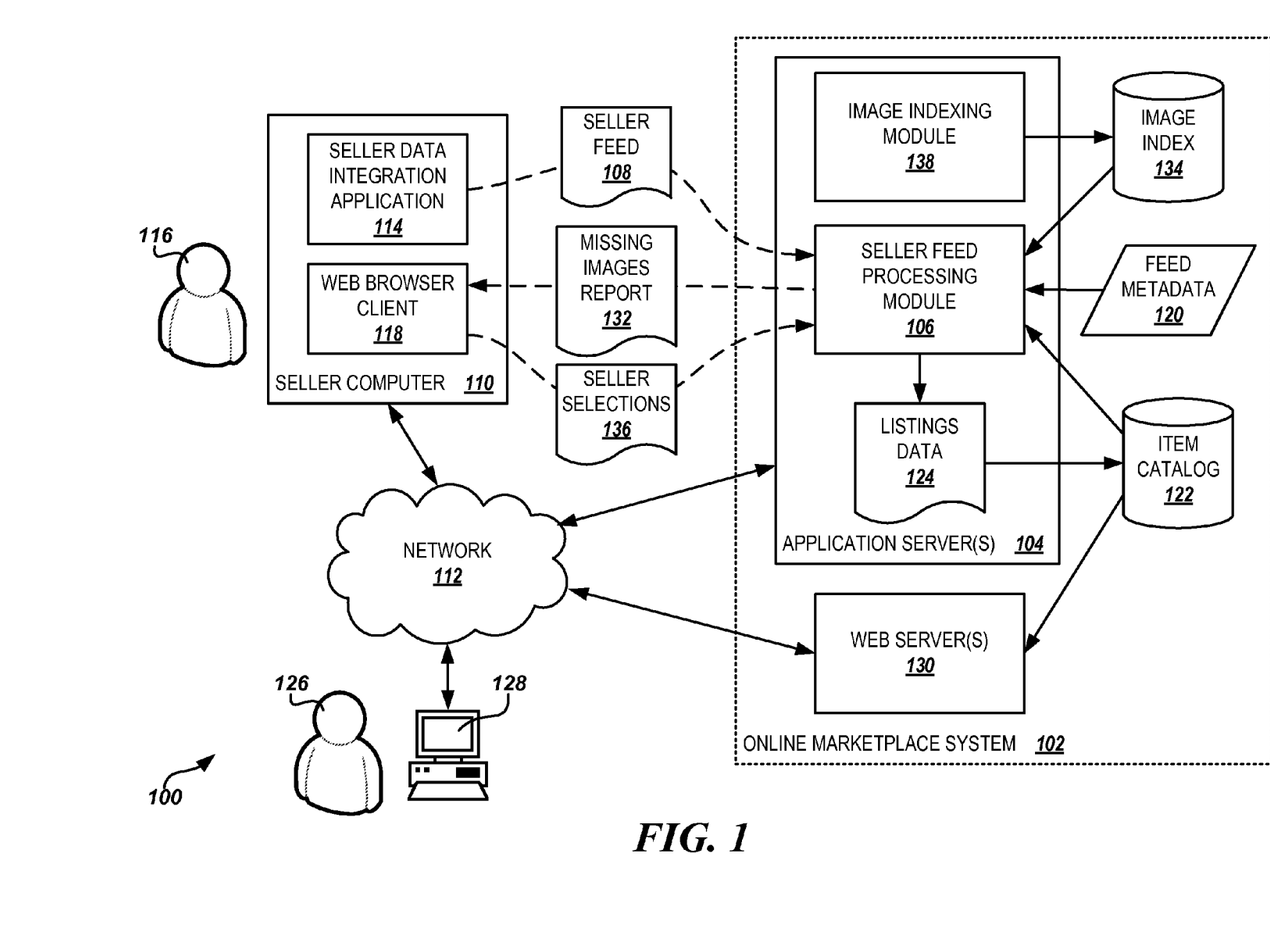
FIG. 1 is a system diagram showing aspects of an illustrative operating environment for a merchant feed processing system, including several software and hardware components provided by embodiments presented herein.

FIG. 1 and the following description are intended to provide a brief, general description of a suitable computing environment in which the embodiments described herein may be implemented. In particular, FIG. 1 is a system diagram that shows an illustrative operating environment 100 for a merchant feed processing system, including several software components for implementing the embodiments described herein for providing suggestions of images for items without images in listings data. The environment 100 includes an online marketplace system 102 that implements an online marketplace. The online marketplace system 102 includes a number of application servers 104 that provide various application services to sellers and customers engaged in commerce through the online marketplace.

The application servers 104 may represent standard server computers, database servers, Web servers, network appliances, desktop computers, other computing devices, and any combination thereof. The application servers 104 may execute a number of modules in order to provide the online marketplace services. The modules may execute on a single application server 104 or in parallel across multiple application servers in the online marketplace system 102. In addition, each module may consist of a number of subcomponents executing on different application servers 104 or other computing devices in the online marketplace system 102. The modules may be implemented as software, hardware, or any combination of the two.

According to embodiments, a seller feed processing module 106 executes on the application servers 104. The seller feed processing module 106 receives seller feed 108 from sellers containing item details describing the items the seller wishes to make available for sale through the online marketplace. The seller feed 108 may be a spreadsheet file, a flat file containing tabular data, an XML file, or any other data container in which the item details can be encapsulated. The seller feed 108 may consist of multiple item listings, each containing a number of fields identifying the item and describing various attributes of the item.

Attributes of an item may include one or more identifiers of the item, such as a seller-specific stock keeping unit ("SKU"), a Universal Product Code ("UPC") or International Article Number ("EAN"), and a manufacturer name and/or model or part number for the item; a title and/or description of the item; image data specifying one or more images for the item; one or more categories for listing the item; keywords related to the item to support item searching; technical specifications for the item; a purchase price; availability information for the item; shipping parameters and costs; a geographic region in which the item is available for purchase; a locale of the seller's fulfillment center; and the like. The seller feed processing module 106 may receive the seller feed 108 from a seller computer 110 over a network 112. The network may be a local area network ("LAN"), a wide-area network ("WAN"), the Internet, or any other networking topology known in the art that connects the seller computer 110 to the application servers 104 in the online marketplace system 102.

In one embodiment, the seller feed 108 may be submitted by a seller data integration application 114 implemented on the seller computer 110. The seller data integration application 114 may represent a software application implemented by the seller to integrate data regarding the items from the seller's internal sales, inventory management, or other systems with the online marketplace system 102 through the seller feed processing module 106. The seller data integration application 114 may also represent a data processing application that allows the seller 116 to specify the item details for the items to be listed in the online marketplace and to generate the seller feed 108 in the proper format for submission to the seller feed processing module 106. For example, the seller data integration application 114 may be a spreadsheet application program that allows entry of the item details for the seller feed 108 into a spreadsheet template generated by the seller feed processing module 106 in the correct format for submission.

In another embodiment, the item details for the items to be listed in the online marketplace may be provided to the seller feed processing module 106 or some other module of the online marketplace system 102 through a Web portal implemented by the online marketplace system 102. A seller 116 may utilize a Web browser client 118 executing on the seller computer 110 to access the Web portal over the network 112 and to specify the item details for each item one by one. The item details for each item may then be validated by the seller feed processing module 106 and merged into the item catalog 122, as will be described below.

According to embodiments, the seller feed processing module 106 may use a combination of feed metadata 120 and existing item details maintained in an item catalog 122 to process and validate the seller feed 108 and produce listings data 124 containing listings for the seller's items in the proper format for inclusion in the online marketplace. The feed metadata 120 may model the seller-facing product attributes, categories, value constraints, and the like contained in the seller feed 108 in a declarative form, as well as provide translations or mappings between the feed data and the listings data 124 formatted for inclusion in the item catalog 122.

The item catalog 122 contains the item details regarding the items listed by the sellers to be presented to customers 126 wishing to purchase the items from the online marketplace. In one embodiment, the customers 126 may utilize user computing devices 128, such as personal computers ("PC"), desktop workstations, laptops, notebooks, personal digital assistants ("PDA"), wireless devices, electronic book readers, or other personal computing devices, to browse, search, and purchase the items in the item catalog 122 through one or more web servers 130 or other presentation service provided by the online marketplace system 102.

The seller feed processing module 106 may utilize the feed metadata 120 to process the item details for each item included in the seller feed 108 and validate that all required attributes have been specified for the item and that the attributes include valid values in a format that can be properly interpreted. The seller feed processing module 106 may further attempt to match the items specified in the item details to existing items in the item catalog 122. For example, the seller feed processing module 106 may utilize one or more item identifying attributes, such as universal product identification number, e.g. UPC or EAN, manufacturer name and/or model number, product description, and the like, specified for each item in the seller feed 108 to match corresponding attributes for items in the item catalog 122.

If a matching item is found in the item catalog 122, then the seller feed processing module 106 may supplement the item details specified in the seller feed 108 with item details from the item catalog 122 to produce a listing for the item in the listings data 124. This may allow for a more robust listing for the item than would be available from just the information provided in the seller feed 108 for the item. If no match items are found, then the seller feed processing module 106 may create a new listing for the item in the listings data 124 from the item details specified in the seller feed 108 for the item. If some of the identification information for an item matches existing items in the item catalog 122, but other identification information does not match, an item matching error may be generated. Any validation errors or matching errors generated by the seller feed processing module 106 in processing the seller feed 108 may be recorded in a feed processing error report (not shown). The feed processing error report may be provided to the seller 116, via the Web portal, e-mail, or the like, once processing of the seller feed 108 is complete.

Additionally or alternatively, other reports regarding the processing of the seller feed 108 may be generated by the seller feed processing module 106 during the processing of the feed. According to one embodiment, the seller feed processing module 106 generates a missing images report 132 regarding item details submitted in the seller feed 108 that do not contain image data identifying one or more images for the corresponding item. The missing images report 132 may be made available to the seller 116 once processing of the seller feed 108 is complete. In one embodiment, the seller 116 may utilize the Web browser client 118 executing on the seller computer 110 to access the missing images report 132 through the Web portal described above.

As will be described below with regard to FIGS. 2 and 3, the missing images report 132 may also include suggestions of one or more images for each item missing image data in the seller feed 108. The suggested images may be selected by the seller feed processing module 106 from an image index 134 maintained in the online marketplace system 102. The image index 134 may identify locations of images for popular products found on the Internet or from other sources. Each image identified in the image index 134 may further be indexed by keywords related to the image, such as manufacturer's name, manufacturer's part or model number, description, UPC or EAN, product category, geographic region or language context of the image, and the like.

Upon reviewing the missing images report 132, the seller 116 may provide seller selections 136 to the seller feed processing module 106 indicating one or more of the suggested images to be utilized in the listings for the corresponding items, as will be described in more detail below in regard to FIG. 3. The seller feed processing module 106 may then include image data regarding the selected images in the listings for the items in the listings data 124 generated from the seller feed 108. Once the listings data 124 is complete, the listings in the listings data may be merged into the item catalog 122 in order to make the seller's items available for purchase through the online marketplace.

According to further embodiments, an image indexing module 138 executes on the application servers 104. The image indexing module 138 maintains the image index 134 by periodically crawling websites on the Internet in order to locate and index images regarding products. For example, the image indexing module 138 may crawl specific manufacturer's websites every 7 days in order to locate product images of popular items. It will be appreciated that the image indexing module 138 may crawl other types of websites or image sources in order to locate images for product, and that the image indexing module may perform the image crawl function more frequently or less frequently than described herein.

When an image of a product is located, the image indexing module 138 may utilize other information from the Web page on which the image appears to extract keywords related to the image. For example, the image indexing module 138 may utilize a caption for the image, alternative text content of the image, text content shown in proximity to the image, the filename of the image, and the like from which to extract the keywords. The keywords may include a manufacturer name, a part number or model number, a UPC or EAN, words or terms from the item's description, and the like. The image indexing module 138 may then store the location, such as a uniform resource locator ("URL"), of each located image in the image index 134.

The locations for the images stored in the image index 134 may be further indexed by the keywords related to the image, using any number of indexing technologies known in the art. In one embodiment, the image indexing module 138 further identifies a geographic region or locale for each image, based on the language or the Web page, the top-level domain of the URL for the image, or a region or locale reported by the Web server hosting the Web page, for example. The images in the image index 134 may further be indexed by geographic region or locale.

Figure 2:
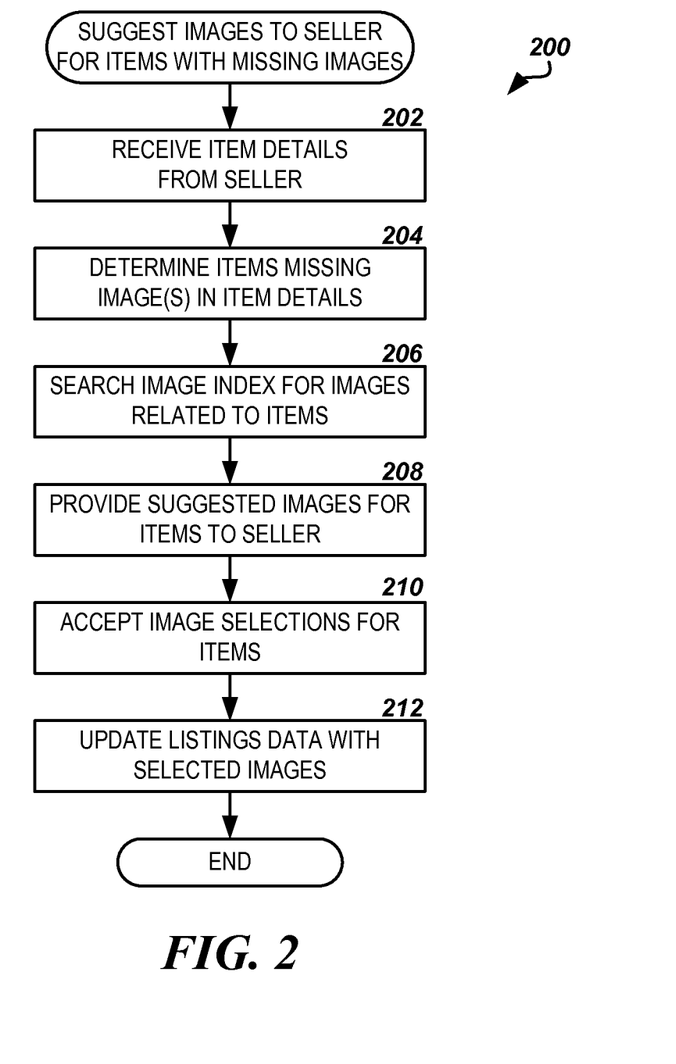
FIG. 2 is a flow diagram showing one method for providing suggestions of images for items without images in listings data, according to embodiments described herein.
Figure 3:
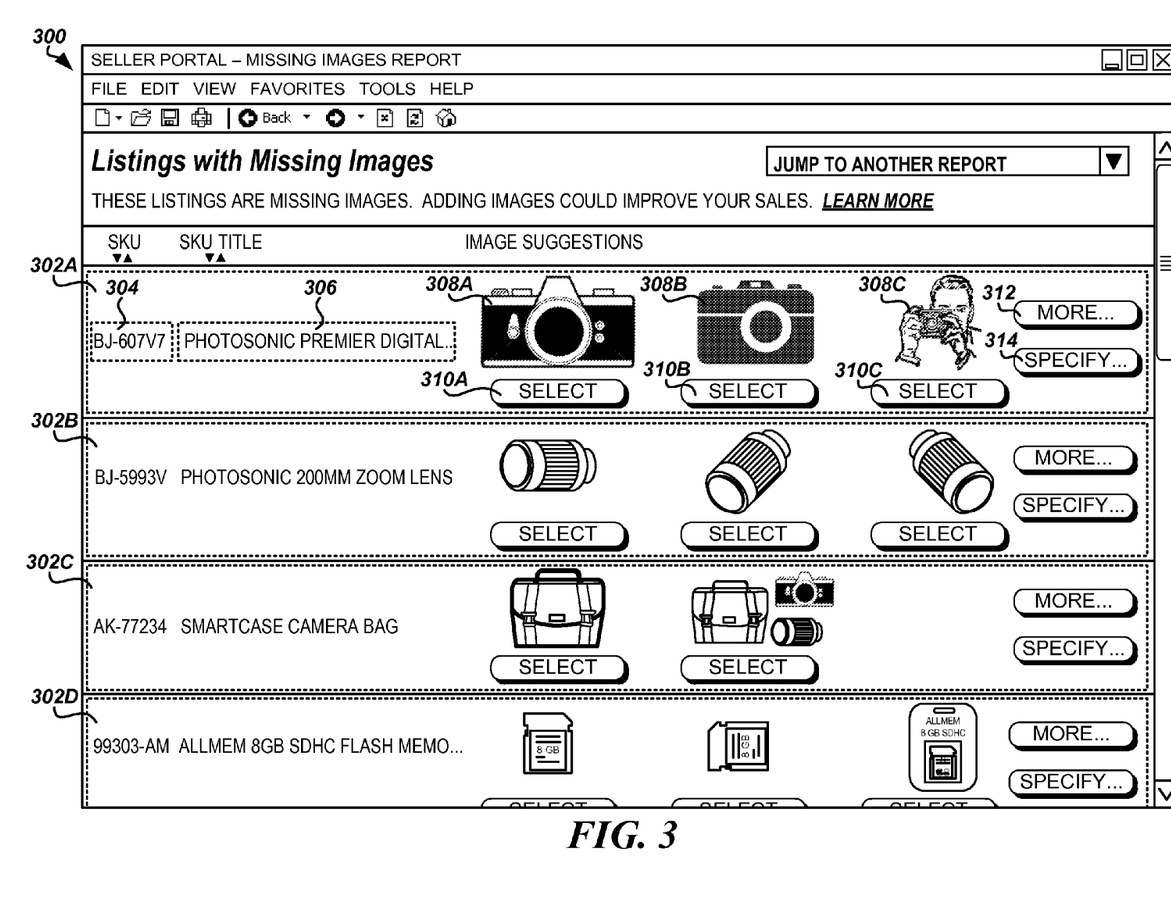
FIG. 3 is a display diagram showing an illustrative screen display of a user interface including suggestions of images for items without images in listings data, according to an embodiment presented herein.

Turning now to FIG. 2, additional details will be provided regarding the embodiments presented herein for providing suggestions of images for items without images in listings data. It should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 illustrates a routine 200 for providing suggestions of images for items without images in listings data, according to one embodiment described herein. The routine 200 may be performed by the seller feed processing module 106, as described above in regard to FIG. 1. It will be appreciated that the routine 200 may also be performed by other modules or components executing on the application servers 104 in the online marketplace system 102, or by any other combination of modules and components.

The routine 200 begins at operation 202, where the seller feed processing module 106 receives item details from the seller regarding items to be listed in the online marketplace. As described above in regard to FIG. 1, the item details may be included in a seller feed 108 submitted by the seller data integration application 114 implemented on the seller computer 110. Alternatively, the item details may be provided to the seller feed processing module 106 by the seller 116 utilizing the Web portal implemented by the online marketplace system 102.

As further described above, the item details may include identifying information regarding the items, including seller-specific SKUs, UPCs or EANs, manufacturer names, manufacturer part and/or model numbers, and the like. The item details may also contain detailed information regarding the items, such as descriptions, image data identifying one or more item images, technical specifications, availability information, listing prices, shipping information, warranty information, and the like. According to one embodiment, the item details regarding each item further includes one or more category specifications for listing the item, and/or one or more keywords supporting item searching of the item catalog 122. For example, for a digital SLR camera, the item details submitted by the seller 116 may include category specifications of "cameras," "digital cameras," and "SLR cameras" as well as keywords such as "10 megapixel," "SD/SDHC," "DSLR," "CMOS sensor." and the like.

From operation 202, the routine 200 proceeds to operation 204, where the seller feed processing module 106 determines those items in the item details that do not have image data identifying at least one image specified for the item for inclusion in the missing images report 132. For example, the seller feed processing module 106 may identify those items specified in the seller feed 108 that have otherwise been successfully processed and validated and for which listings have been generated in the listings data 124, but that do not include any item images. According to one embodiment, these items may be eligible for inclusion in the item catalog 122 without images, and the seller feed processing module 106 may merge the listings for the items into the item catalog with or without the selection of a suggested image from the seller 116. In another embodiment, an item for which no image data is included in the item details, but for which a matching item with images exists in the item catalog 122 by the seller feed processing module 106 may not be included in the missing images report 132.

The routine 200 proceeds from operation 204 to operation 206, where the seller feed processing module 106 searches the image index 134 for images related to each item with missing image data. The seller feed processing module 106 may search the keyword index for images identified in the image index 134 utilizing other attributes from the item details. For example, the seller feed processing module 106 may search the keyword index by one or more of the UPC or EAN, manufacturer name, manufacturer part and/or model number, category specifications, and keywords for an item supplied in the item details in order to locate images related to the item.

In one embodiment, the seller feed processing module 106 may further use geographic region or locale information specified in the item details to search the image index 134. In another embodiment, the seller feed processing module 106 may use additional or alternative means for locating images related to the item beyond searching the image index 134. For example, the seller feed processing module 106 may utilize specific attributes from the item details, such as the UPC or EAN, manufacturer name, manufacturer part and/or model number, and the like, to search for images through an image search service provided through the Internet, such as the GOOGLE® IMAGES™ search service from GOOGLE Inc. of Mountain View, Calif.

The seller feed processing module 106 may then select a number of the item images located by the search as suggestions of images for the items included in the missing images report 132. For example, the seller feed processing module 106 may select the top four strongest matching images from the image index 134 for each item as suggested images. In one embodiment, the seller feed processing module 106 may only select images from the image index 134 where the indexed keywords for the image match at least two of the searched attributes, in order to provide a minimum level of confidence that the suggested image is related to the item.

From operation 206, the routine proceeds to operation 208, where the seller feed processing module 106 provides the selected images to the seller 116 as suggestions for the items in the missing images report 132. According to one embodiment, the seller feed processing module 106 may retrieve thumbnails or other representative forms of the suggested images from the locations of the images specified in the image index 134, and include the thumbnails along with an identifier of each item missing image data in the missing images report 132. For example, FIG. 3 shows an illustrative screen display showing a user interface ("UI") 300 presenting a missing images report 132, according to one embodiment. The UI 300 may be presented to the seller 116 through the web browser client 118 executing on the seller computer 110, for example.

The UI 300 includes a window containing the missing images report 132. Each item missing image data in the item details may be listed individually in an item panel 302A-302D in the window. Each item panel may include one or more identifiers of the item that is missing the image data, such as an item SKU 304 and item description 306 shown in item panel 302A in FIG. 3. In addition, a number of image thumbnails 308A-308C or other representation of each suggested image for the item is shown in the item panel 302A. It will be appreciated that the number of thumbnails 308A-308C shown for an item may vary depending on the number of suggested images located in the image index 134 related to the item, the number of suggested images meeting the minimum level of confidence, the amount of screen space available in the UI 300, and the like. For some items, no thumbnails 308A-308C may be shown.

The user may be able to select an image thumbnail 308A-308C, by clicking the thumbnail with a mouse, for example, in order to see a full-sized version of the corresponding suggested image, or to be taken to the location identified in the image index 134 for the image in order to see the original image in the context of the webpage on which the image was found. According to one embodiment, the UI 300 further controls a selection UI control 310A-310C associated with each thumbnail 308A-308C corresponding to a suggested image. The seller 116 may select the selection UI control 310A-310C corresponding to the desired suggested image in order to select that image to be included in the listings data 124 for the item merged into the item catalog 122. In another embodiment, the selection UI controls 310A-310C may allow more than one suggested image to be selected by the seller 116 for an item.

The UI 300 may also contain a more images UI control 312 that allows the seller to see more suggested images for the item in the item panel 302A-302C. In one embodiment, selecting the more images UI control 312 may display new thumbnails 308A-308C corresponding to additional suggested images located by the seller feed processing module 106 in the image index 134. In another embodiment, when the more images UI control 312 is selected, the seller 116 is prompted to provide additional or alternative keywords, and the seller feed processing module 106 may re-perform the search of the image index 134 using the new keywords in order to locate new suggested images for the item. Image thumbnails 308A-308C corresponding to the newly located suggested images may then be shown in the item panel 302A-302D corresponding to the item.

According to a further embodiment, the UI may also include an image specification UI control 314. The image specification UI control 314 may allow the seller to specify the location, such as an URL, of an alternative image to be included in the listings data 124 for the item merged into the item catalog 122. The seller 116 may utilize the UI 300 to make selections of suggested images for some, all, or none of the items listed in the missing images report. It will be appreciated that the UI 300 containing the missing images report 132 may include any number of item panels 302A-302D and additional and/or alternative UI components and controls beyond those shown in FIG. 3 and described herein. In another embodiment, the seller feed processing module 106 or some other module in the online marketplace system 102 may search the image index 134 and provide thumbnails 308A-308C of suggested images in response to a seller providing item details regarding an item through the Web portal, as described above, using a UI similar to the UI 300 shown in FIG. 3.

Returning to operation 210 in FIG. 2, the seller feed processing module 106 or some other module in the online marketplace system 102 may receive the seller selections 136 specifying the one or more suggested images to be used for the items missing image data made by the seller 116 through the UI 300. The routine 200 then proceeds from operation 210 to operation 212, where the seller feed processing module 106 updates the listings data 124 with the selected images accordingly, and merges the updated listings data 124 in the item catalog 122. From operation 212, the routine 200 ends.

Figure 4:
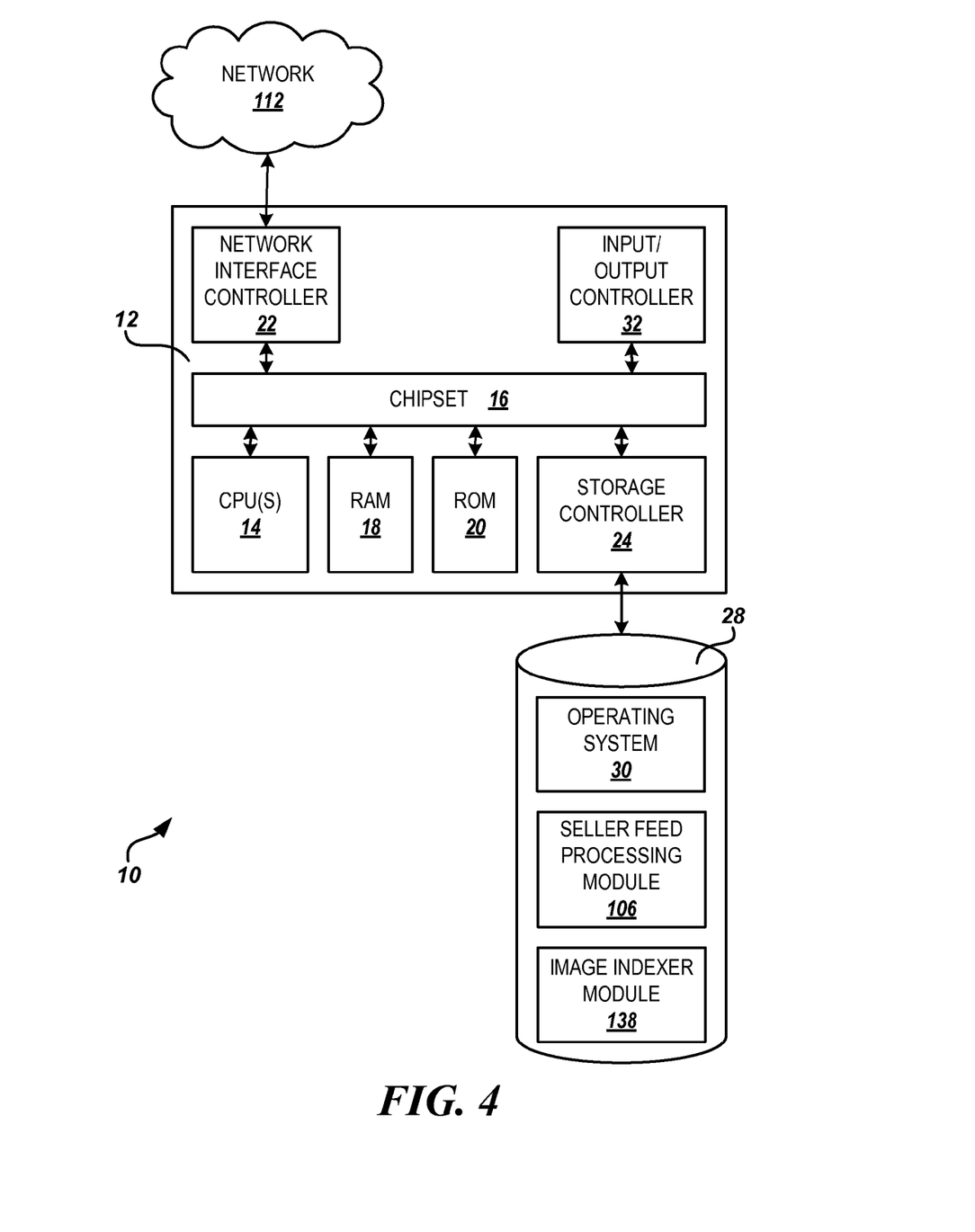
FIG. 4 is a computer architecture diagram showing an illustrative computer hardware architecture for computing devices described in embodiments presented herein.

FIG. 4 shows an example computer architecture 10 for a computer 12 capable of executing the software components of the merchant feed processing system, as presented above. The computer architecture 10 shown in FIG. 4 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104, seller computer 110, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 112, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 112, such as other application servers 104, the seller computer 110, the user computing device 128, a data storage system in the online marketplace system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of the physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the seller feed processing module 106, which was described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 200 for suggesting images or items without images in listings data, as described above in regard to FIG. 2.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computer 12 may not include all of the components shown in FIG. 4, may include other components that are not explicitly shown in FIG. 4, or may utilize an architecture completely different than that shown in FIG. 4.

Based on the foregoing, it should be appreciated that providing suggestions of images for items without images in listings data is presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
    periodically crawl websites of product manufacturers to locate product images;
    index the located product images in an image index by keywords extracted from the websites;
    receive from a seller item details regarding an item;
    determine whether the item details include image data specifying one or more images for the item;
    upon determining that item details do not include the image data, search the image index by one or more identifying attributes for the item from the item details to locate product images related to the item; and
    present one or more product images related to the item from the image index to the seller as suggested images for the item.

2. The non-transitory computer-readable storage medium of claim 1, wherein each product image is indexed by one or more of a universal product identification number, a manufacturer name, a manufacturer model number, a product description, a category, or a keyword in the image index.

3. The non-transitory computer-readable storage medium of claim 1, wherein the image index is further searched by a geographic region or locale from the item details.

4. The non-transitory computer-readable storage medium of claim 1, wherein the suggested images are presented to the seller through a user interface providing a means for selecting one or more of the suggested images for inclusion in listings data for the item.

5. The non-transitory computer-readable storage medium of claim 4, wherein the user interface further provides a means for the seller to specify one or more additional keywords regarding the item, and having further computer-executable instructions stored thereon that cause the computer to:
    re-search the image index by the one or more additional keywords to locate new product images related to the item; and
    presenting one or more new product images related to the item to the seller as suggested images for the item.

6. The non-transitory computer-readable storage medium of claim 4, wherein the user interface further provides a means for the seller to specify a location of an image regarding the item for inclusion in the listings data for the item.

7. A computer-implemented method for suggesting images for an item missing image data in item details submitted by a seller, the method comprising executing instructions on a computer to perform the operations of:
    using at least a computer processor to periodically crawl websites of product manufacturers to locate product images;
    indexing the located product images in an image index by keywords extracted from the websites;
    receiving from the seller item details regarding the item;
    determining that image data specifying one or more images for the item is missing from the item details;
    upon determining that the image data is missing, searching the image index by one or more identifying attributes for the item from the item details to locate product images related to the item;
    showing one or more suggested images from the image index to the seller;
    receiving a selected image from the seller; and
    adding image data regarding the selected image to listings data for the item.

8. The computer-implemented method of claim 7, wherein the websites comprise product manufacturer websites.

9. The computer-implemented method of claim 7, wherein each image is indexed by one or more of a universal product identification number, a manufacturer name, a manufacturer model number, a product description, a category, or a keyword in the image index.

10. The computer-implemented method of claim 7, wherein searching the image index for images related to the item comprises searching the image index by one or more keywords specified in the item details regarding the item.

11. The computer-implemented method of claim 10, wherein searching the image index for images related to the item further comprises searching the image index by a geographic region or locales specified in the item details regarding the item.

12. The computer-implemented method of claim 10, further comprising executing instructions on the computer to perform the operations of:

receiving one or more additional keywords regarding the item from the seller;

re-searching the image index for images related to the item using the additional keywords; and showing one or more new suggested images from the image index to the seller.

13. The computer-implemented method of claim 10, wherein the one or more suggested images include at least one image from an item catalog containing existing item details regarding the item.

14. The computer-implemented method of claim 10, further comprising executing instructions on the computer to perform the operations of:

receiving a specification of a location of an image regarding the item from the seller; and adding image data regarding the image at the location to the item details.

15. The computer-implemented method of claim 7, wherein the selected image is shown to a customer purchasing the item from the seller through an online marketplace system.

16. A system for suggesting images for an item missing image data in item details submitted by a seller, the system comprising:

one or more application servers in an online marketplace system; and one or more modules executing on the application servers and configured to periodically crawl websites of product manufacturers to locate product images, index the located product images in an image index by keywords extracted from the websites, receive from the seller item details regarding the item, determine whether image data specifying one or more images for the item is missing from the item details, upon determining that the image data is missing, search the image index by one or more identifying attributes for the item from the item details to locate product images related to the item, and present one or more product images related to the item from the image index to the seller as suggested images for the item.

17. The system of claim 16, wherein the image index is further searched by a geographic region or locale from the item details.

18. The system of claim 16, wherein the suggested images are presented to the seller through a user interface providing a means for selecting one or more of the suggested images for inclusion in listings data for the item.

19. The system of claim 18, wherein the user interface further provides a means for the seller to specify one or more additional keywords regarding the item, and wherein the one or more modules are further configured to:

re-search the image index by the one or more additional keywords to locate new product images related to the item; and present one or more new product images related to the item to the seller as suggested images for the item.

20. The system of claim 18, wherein the user interface further provides a means for the seller to specify a location of an image regarding the item for inclusion in the listings data for the item.

* * * * *